(12) United States Patent
Lee et al.

(10) Patent No.: US 11,828,332 B2
(45) Date of Patent: Nov. 28, 2023

(54) WHEEL BEARING HAVING IMPROVED STRUCTURES OF TONE WHEEL AND TONE WHEEL MOUNTING PART

(71) Applicant: ILJIN GLOBAL Co., Ltd, Seoul (KR)

(72) Inventors: Jun Ho Lee, Seoul (KR); Sang Jun Lee, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 163 days.

(21) Appl. No.: 17/492,988

(22) Filed: Oct. 4, 2021

(65) Prior Publication Data

US 2022/0025932 A1   Jan. 27, 2022

Related U.S. Application Data

(63) Continuation of application No. PCT/KR2020/004600, filed on Apr. 3, 2020.

(30) Foreign Application Priority Data

Apr. 3, 2019 (KR) .......................... 10-2019-0039294

(51) Int. Cl.
*F16C 41/00* (2006.01)
*B60B 27/00* (2006.01)

(52) U.S. Cl.
CPC ........ *F16C 41/007* (2013.01); *B60B 27/0068* (2013.01); *F16C 2326/02* (2013.01)

(58) Field of Classification Search
CPC .............. F16C 41/007; F16C 2326/02; B60B 27/0068; G01P 3/443
See application file for complete search history.

(56) References Cited

U.S. PATENT DOCUMENTS

| 5,046,867 A * | 9/1991 | Hilby | F16C 41/007 324/207.2 |
| 5,920,193 A * | 7/1999 | Tola | F16C 33/723 324/207.25 |

(Continued)

FOREIGN PATENT DOCUMENTS

| JP | H116839 A | 1/1999 |
| JP | 2007093011 A | 4/2007 |

(Continued)

OTHER PUBLICATIONS

International Search Report of PCT/KR2020/004600 dated Jul. 7, 2020.

*Primary Examiner* — Alan B Waits
(74) *Attorney, Agent, or Firm* — Dinsmore & Shohl LLP; Yongsok Choi, Esq.

(57) ABSTRACT

There is provided a wheel bearing for rotatably mounting and supporting a wheel of a vehicle to a vehicle body. The wheel bearing includes a rotary element on which the wheel of the vehicle is mounted and which rotates together with the wheel; a non-rotary element mounted on a chassis component of the vehicle and fixed to the vehicle body; and one or more rolling elements provided between the rotary element and the non-rotary element and configured to rotatably support the rotary element relative to the non-rotary element. The rotary element includes a wheel mounting flange used for mounting the wheel, and a tone wheel or an encoder configured to measure a rotational speed of the wheel may be mounted on a vehicle-body-side end surface of the wheel mounting flange.

15 Claims, 7 Drawing Sheets

(56) References Cited

U.S. PATENT DOCUMENTS

| | | | |
|---|---|---|---|
| 5,921,633 A | 7/1999 | Neibling et al. | |
| 2008/0199120 A1* | 8/2008 | Torii | F16C 33/805 |
| | | | 384/480 |
| 2010/0142875 A1* | 6/2010 | Mori | F16C 33/6614 |
| | | | 384/572 |
| 2010/0296759 A1 | 11/2010 | Dlugai et al. | |
| 2019/0126676 A1* | 5/2019 | Hubert | G01P 3/488 |

FOREIGN PATENT DOCUMENTS

| | | |
|---|---|---|
| JP | 2014201212 A | 10/2014 |
| KR | 1020020044468 A | 6/2002 |

* cited by examiner ated in FIGS. 1 and 2.

WHEEL BEARING HAVING IMPROVED STRUCTURES OF TONE WHEEL AND TONE WHEEL MOUNTING PART

CROSS-REFERENCE TO RELATED APPLICATIONS

This is a continuation of International Application No. PCT/KR/2020/004600 filed on Apr. 3, 2020, which claims priority to Korean Patent Application No. 10-2019-0039294 filed on Apr. 3, 2019, the entire contents of which are herein incorporated by reference.

TECHNICAL FIELD

The present disclosure relates to a wheel bearing used for rotatably mounting and supporting a wheel of a vehicle to a vehicle body, and more particularly, to a wheel bearing configured such that a wheel speed sensing structure can be more easily formed by improving a structure of a tone wheel (sensor target) mounted on the wheel bearing to measure a rotational speed of a wheel and a mounting portion for such a tone wheel.

BACKGROUND ART

A bearing is a part that rotatably supports a rotary element relative to a non-rotary element in a rotating device. A wheel bearing is used for rotatably mounting and supporting a wheel of a vehicle to a vehicle body.

As illustrated in FIGS. 1 and 2, such a wheel bearing is conventionally configured such that a rotary element (for example, a wheel hub 10 and an inner ring 20) on which a wheel of a vehicle is mounted is coupled to a non-rotary element 30 or an outer ring fixed to a vehicle body through rolling elements 40 so as to rotatably support the wheel mounted on the rotary element with respect to the vehicle body.

On the other hand, a wheel bearing for a vehicle may comprise a wheel speed sensor (WSS) that measures a rotational speed of a wheel and may be configured so that a controller such as an anti-lock brake system (ABS) operates using information on the rotational speed measured by the wheel speed sensor.

Conventionally, a wheel speed sensor is configured such that a sensor member is disposed adjacent to a tone wheel (or an encoder) mounted on a rotary element rotating together with a wheel to detect a change in magnetic field generated due to rotation of the tone wheel (or the encoder), thereby measuring a rotational speed of the wheel.

For example, as illustrated in FIG. 1, the wheel speed sensor is configured such that a tone wheel 50 or the like is mounted on a middle portion of the rotary element and a sensor member 60 is disposed adjacent to the tone wheel 50 via an outer ring 30 or the like so as to measure a rotational speed of the wheel. Alternatively, as illustrated in FIG. 2, the wheel speed sensor is configured such that the tone wheel 50 is mounted on one-side end portion (for example, vehicle-body-side end portion) of the rotary element, and then the sensor member 60 is disposed adjacent to the tone wheel 50 using a cap member or the like so as to measure a rotational speed of the wheel.

Here, in a vehicle having a power transmission structure in the form of axle tube, such as a rear-engine rear driven (RR) type truck, an axle is assembled while being inserted into a tube housing. This makes it difficult to ensure, around the rotary element of the wheel bearing, a structural space in which the tone wheel and/or the sensor member are (is) mounted. As a result, there is a problem that it is difficult to utilize the conventional wheel speed sensing structure illustrated in FIGS. 1 and 2.

Due to this problem, wheel bearings of a third-generation structure, which have been used widely in recent years, may not be applied to the vehicle having a power transmission structure in the form of axle tube, and most products have been manufactured through the application of wheel bearings of a first-generation structure.

SUMMARY

Technical Problem

The present disclosure was made for the purpose of solving the above problems related to a wheel bearing, and an object of the present disclosure is to provide a technique capable of improving a degree of freedom in design of a wheel bearing provided with a wheel speed sensor and further enhancing the productivity and operational reliability of the wheel speed sensor and the wheel bearing provided with the wheel speed sensor by improving a structure of a tone wheel used for measuring a rotational speed of the wheel and a mounting portion of such a tone wheel.

Technical Solution

Representative configurations of the present disclosure for achieving the above objects are as follows.

According to an embodiment of the present disclosure, there is provided a wheel bearing for rotatably mounting and supporting a wheel of a vehicle to a vehicle body. The wheel bearing according to an embodiment of the present disclosure may comprise: a rotary element on which the wheel of the vehicle is mounted and which rotates together with the wheel; a non-rotary element mounted on a chassis component of the vehicle and fixed to the vehicle body; and one or more rolling elements provided between the rotary element and the non-rotary element and configured to rotatably support the rotary element with respect to the non-rotary element. According to an embodiment of the present disclosure, the rotary element may comprise a wheel mounting flange used for mounting the wheel, and a tone wheel or an encoder configured to measure a rotational speed of the wheel may be mounted on a vehicle-body-side end surface of the wheel mounting flange.

According to an embodiment of the present disclosure, the tone wheel configured to measure the rotational speed of the wheel may be mounted on the vehicle-body-side end surface of the wheel mounting flange, the tone wheel may comprise a disc-shaped base to be mounted on the wheel mounting flange, and a plurality of windows having an open structure may be provide in the disc-shaped base at equal intervals in a circumferential direction.

According to an embodiment of the present disclosure, the tone wheel may comprise bolt inserting holes formed at positions corresponding to bolt mounting holes of the wheel mounting flange and into which hub bolts are inserted when the tone wheel is mounted on the wheel mounting flange.

According to an embodiment of the present disclosure, the windows of the tone wheel may be formed such that the windows are disposed on a radially outer portion of the bolt inserting holes.

According to an embodiment of the present disclosure, the wheel mounting flange may comprise a recess formed to be depressed inwardly from a portion where the window of the tone wheel is positioned when the tone wheel is mounted.

According to an embodiment of the present disclosure, the recess formed in the wheel mounting flange may be formed at a depth of 1 mm or more.

According to an embodiment of the present disclosure, the wheel bearing may further comprise a sensor member disposed adjacent to the tone wheel mounted on the wheel mounting flange.

According to an embodiment of the present disclosure, the sensor member may be configured to measure the rotational speed of the wheel in a direction perpendicular to the disc-shaped base of the tone wheel.

According to an embodiment of the present disclosure, the tone wheel may further comprise an extension portion extending in an axial direction from the disc-shaped base.

According to an embodiment of the present disclosure, the extension portion may be configured to partially or entirely cover the wheel-side sealing member from a radially outer side of the wheel-side sealing member of the wheel bearing.

According to an embodiment of the present disclosure, a distance between the extension portion of the tone wheel and a radial outermost portion of the wheel-side sealing member may be set to be 0.3 mm or more.

According to an embodiment of the present disclosure, the windows formed in the tone wheel may be formed to have a width of 1 mm or more and a height of 1 mm or more.

According to an embodiment of the present disclosure, the rotary element of the wheel bearing may comprise a wheel hub on which the wheel is mounted, and at least one inner ring mounted on the wheel hub in a press-fitting manner, the non-rotary element of the wheel bearing may be formed as an outer ring to be coupled to the chassis component of the vehicle, and the wheel mounting flange may be provided in the wheel hub.

Further, the wheel bearing according to the present disclosure may further comprise other additional configurations without departing from the technical sprit of the present disclosure.

Advantageous Effects

A wheel bearing according to an embodiment of the present disclosure is configured such that a tone wheel (or an encoder) for measuring a rotational speed of a wheel is mounted on a wheel mounting flange of a rotary element on which the wheel is mounted. Thus, it is possible to easily mount the tone wheel and a sensor member on a wheel bearing even if a power transmission structure is configured in the form of axle tube or the like. For example, it is possible to easily apply a wheel bearing of a third-generation structure even if a type of power transmission structure is formed in the form of axle tube.

Further, a wheel bearing according to an embodiment of the present disclosure is configured such that a tone wheel for measuring a rotational speed of a wheel is mounted on a wheel mounting flange using hub bolts, which are used for mounting the wheel on the wheel mounting flange. Thus, it is possible to easily mount the tone wheel to the wheel bearing without adding a separate mounting structure or a separate mounting process, thereby improving the productivity of the wheel bearing and reducing the production cost of the wheel bearing.

Furthermore, a wheel bearing according to an embodiment of the present disclosure is configured such that a portion of a tone wheel mounted on the wheel mounting flange extends in an axial direction to partially or entirely cover a radially outer portion of a wheel-side sealing member. Thus, an additional labyrinth structure may be formed between an outer peripheral surface of the wheel-side sealing member and the tone wheel. This makes it possible to further improve the sealing property of the wheel-side sealing member without a separate additional member.

EXPLANATION OF REFERENCE NUMERALS

Figure 1:
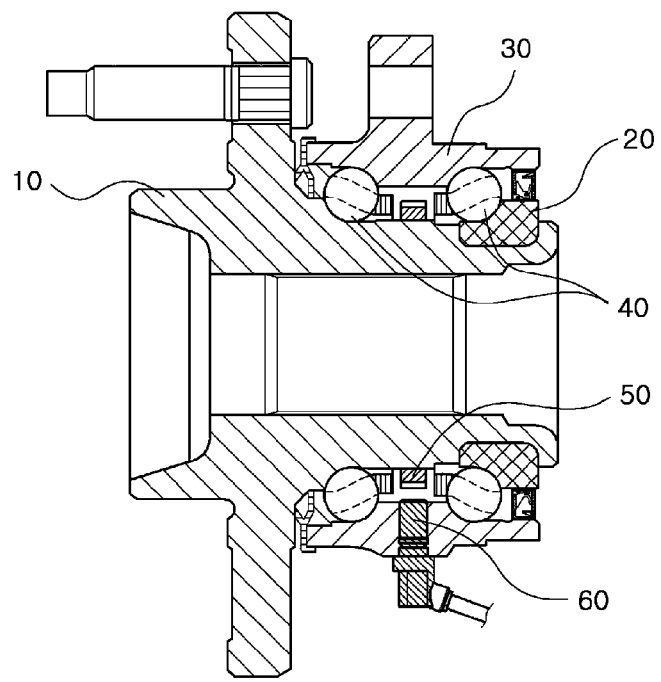
FIGS. 1 and 2 exemplarily show a conventional wheel bearing with a wheel speed sensor.
Figure 2:
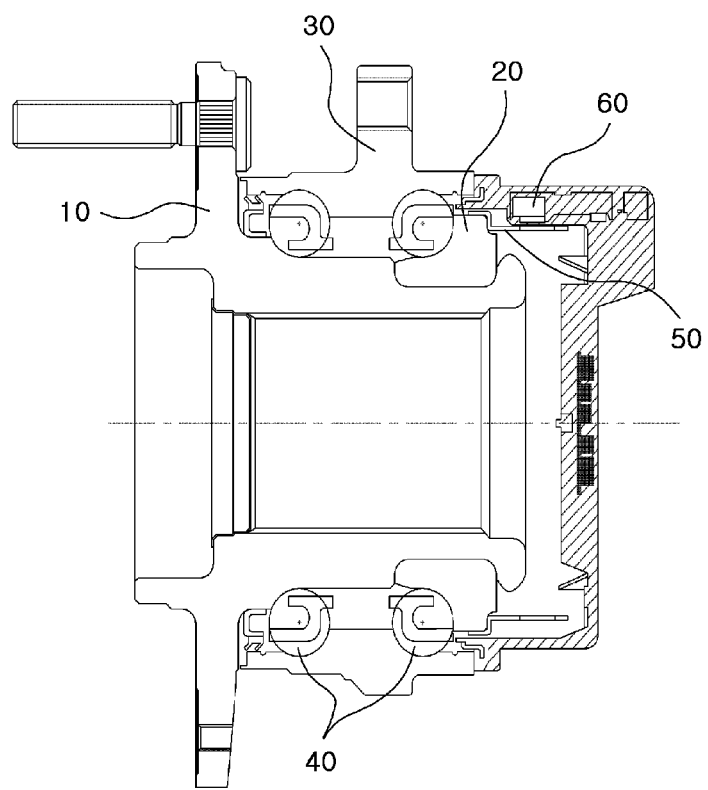
Figure 3:
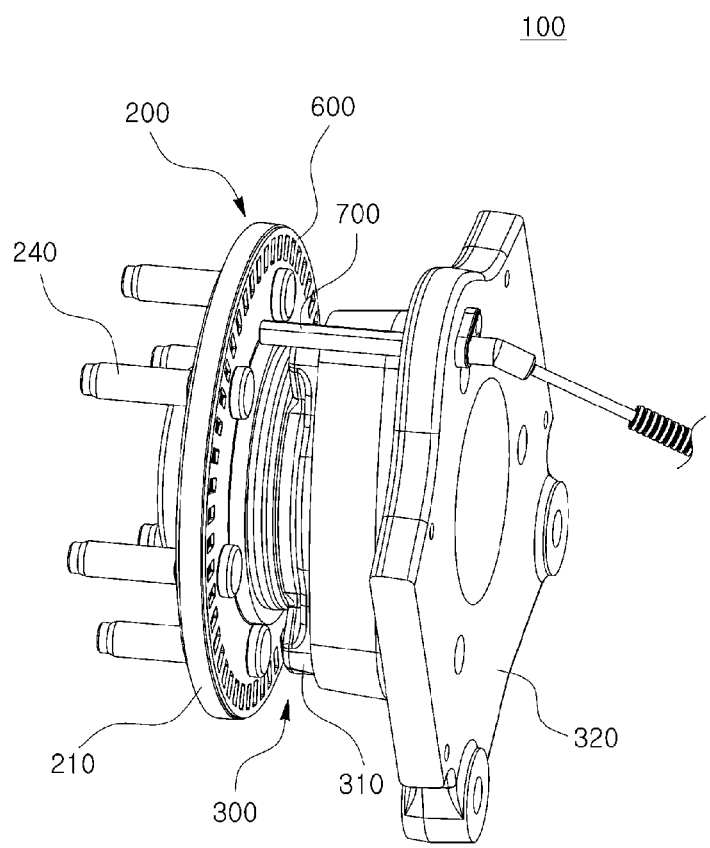
FIG. 3 exemplarily shows a wheel bearing according to an embodiment of the present disclosure and a portion of a chassis member on which the wheel bearing is mounted.
Figure 4:
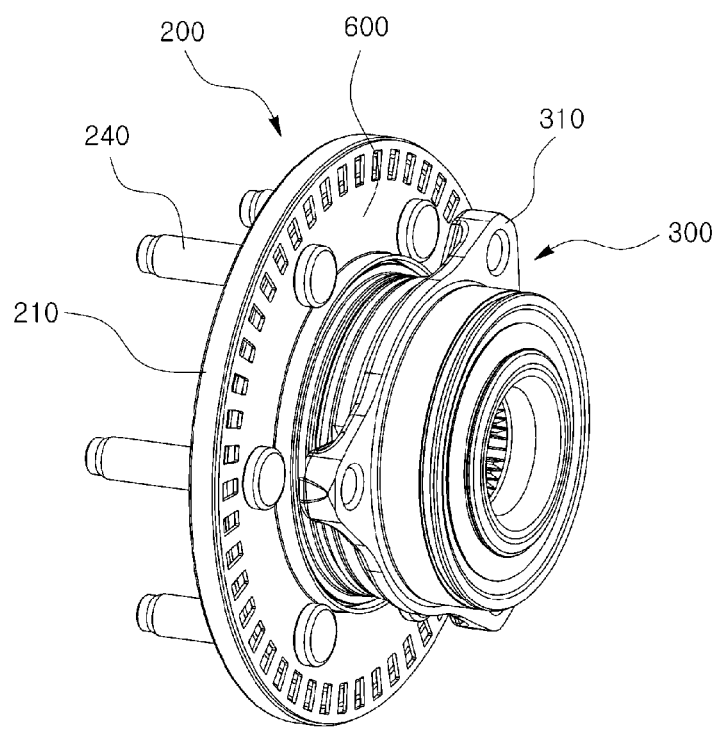
FIG. 4 exemplarily shows a structure of the wheel bearing (in a state in which a chassis member mounted on an outer ring is removed) according to an embodiment of the present disclosure.

100: wheel bearing
200: rotary element
210: wheel hub
220: inner ring
230: wheel mounting flange
232: bolt mounting hole
234: stepped portion
236: recess
238: mounting portion
240: hub bolt
300: non-rotary element
310: vehicle-body-side mounting flange
320: chassis member (connected to outer ring)
400: rolling element
500: sealing member
600: tone wheel
610: disk-shaped base
620: window
630: bolt inserting hole
640: extension portion
700: sensor member

DETAILED DESCRIPTION

Preferred embodiments of the present disclosure will be described in detail below with reference to the appended drawings to such an extent that the present disclosure can be readily carried out by one of ordinary skill in the art.

Detailed descriptions of parts irrelevant to the present disclosure will be omitted for the purpose of clearly describing the present disclosure. Throughout the specification, the same constituent elements will be described using the same reference numerals. In addition, the shapes and sizes of the respective constituent elements illustrated in the drawings are arbitrarily illustrated for the sake of convenience of description, and hence the present disclosure is not necessarily limited to the illustrated shapes and sizes. That is, it should be understood that specific shapes, structures, and characteristics described in the specification may be modified from one embodiment to various embodiments without departing from the spirit and scope of the prevent disclosure, and positions or dispositions of individual constituent elements may be modified without departing from the spirit and scope of the prevent disclosure. Therefore, detailed descriptions to be described below should be construed as non-limitative senses, and the scope of the prevent disclosure should be understood to include appended claims and their equivalents.

Tone Wheel and Wheel Bearing Having the Same According to an Embodiment of the Present Disclosure Referring to FIGS. 3 to 7, a wheel bearing according to an embodiment of the present disclosure is exemplarily shown. As shown in the drawings, the wheel bearing according to an embodiment of the present disclosure may be formed similar to a conventional wheel bearing in an overall configuration. For example, a wheel bearing 100 according to an embodiment of the present disclosure may be configured such that a rotary element 200 on which a wheel is mounted is rotatably supported with respect to a non-rotary element 300 or an outer ring connected to a vehicle body through a plurality of rolling elements 400, like a conventional wheel bearing. A sealing member 500 may be configured to be provided in one-side end portion or both-side end portions of the wheel bearing 100 so as to prevent inflow of external foreign substances.

According to an embodiment of the present disclosure, the rotary element 200 may comprise a wheel hub 210 on which the wheel is mounted, and an inner ring 220 mounted on the wheel hub 210 in a press-fitting manner. The non-rotary element 300 may be an outer ring that is coupled to a chassis component of the vehicle and fixed to the vehicle body. However, the wheel bearing 100 according to an embodiment of the present disclosure is not limited to the above-described structure, but may be modified in other various structures that are applicable to conventional wheel bearings.

According to an embodiment of the present disclosure, the wheel hub 210 constituting the rotary element 200 may be formed in a substantially cylindrical shape extending in the axial direction. A wheel mounting flange 230 (hub flange) may be provided near a wheel-side end portion of the wheel hub 210, and hub bolts 240 may be fastened to bolt mounting holes 232 formed in the wheel mounting flange 230 so that the wheel and/or a brake disc are (is) mounted on the wheel mounting flange 230. On the other hand, a stepped portion 234 may be formed at a vehicle-body-side end portion of the wheel hub 210 such that the inner ring 220 is mounted on the stepped portion 234. A raceway (inner raceway) may be configured to be formed on a portion of an outer peripheral surface of the wheel hub 210 to support the rolling elements 400 from the inside in a radial direction.

Figure 5:
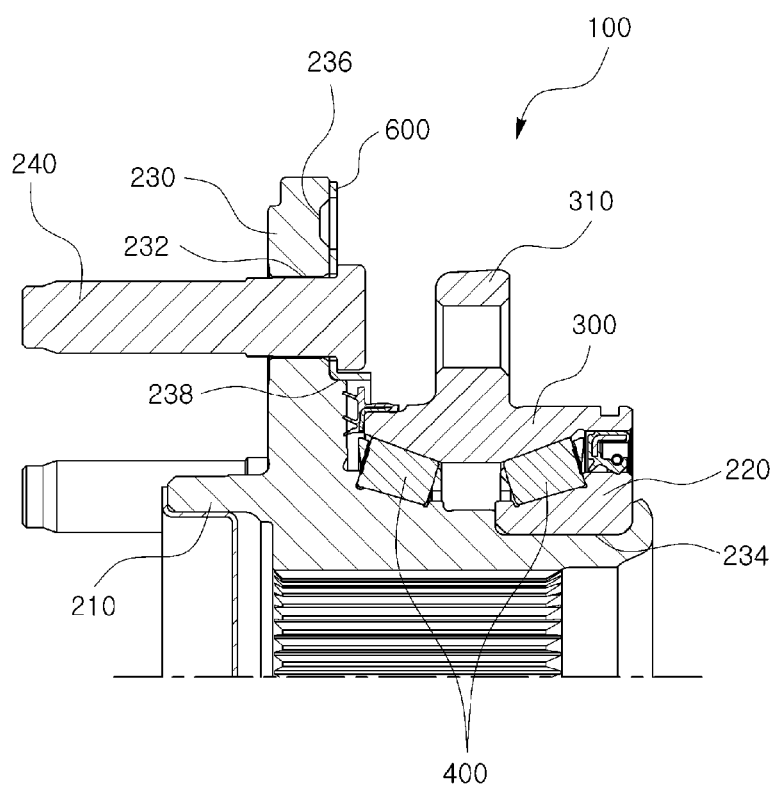
FIG. 5 exemplarily shows a cross-sectional structure of the wheel bearing according to an embodiment of the present disclosure.
Figure 6:
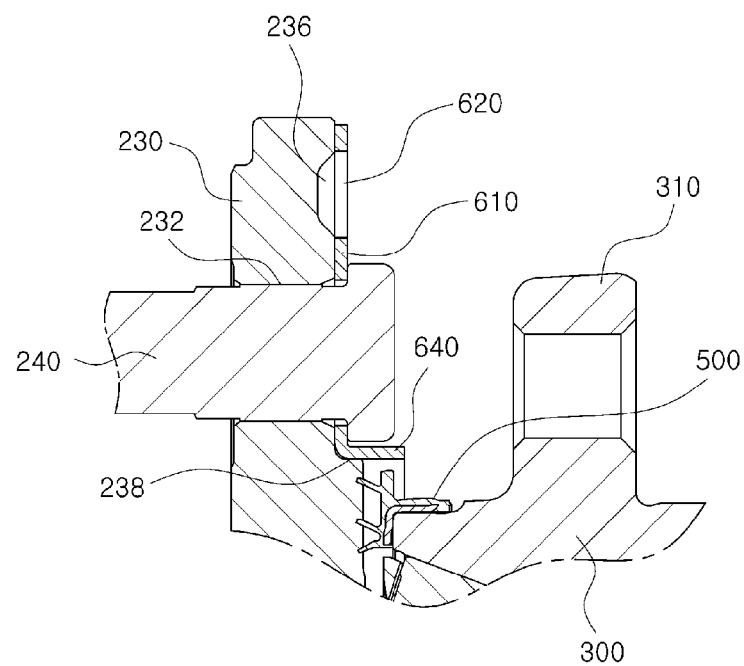
FIG. 6 is an enlarged view of a structure of a tone wheel mounting portion in the wheel bearing illustrated in FIGS. 3 to 5.
Figure 7:
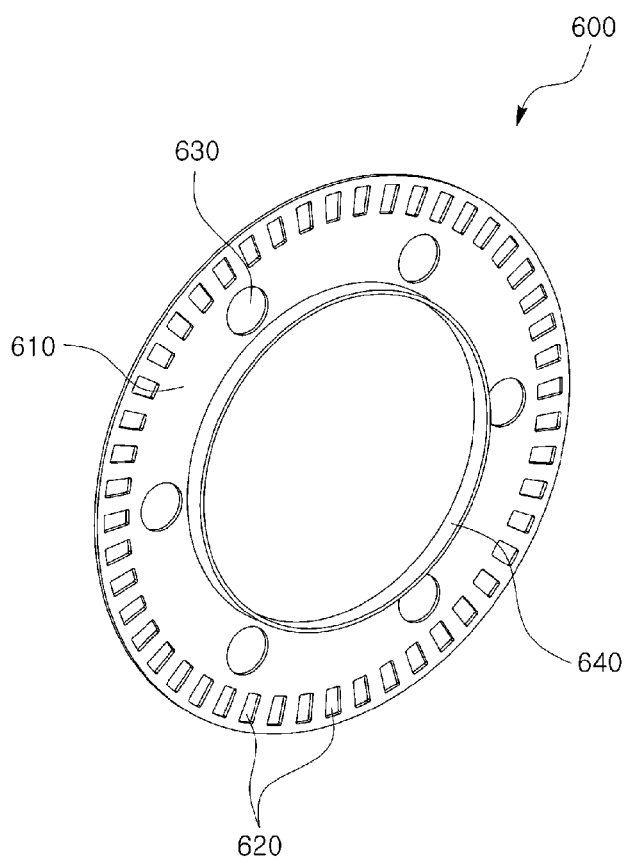
FIG. 7 exemplarily shows a structure of a tone wheel mounted on the wheel bearing to measure a rotational speed of a wheel in the wheel bearing according to an embodiment of the present disclosure.

According to an embodiment of the present disclosure, the inner ring 220 may be mounted on one side of the wheel hub 210 in a press-fitting manner. For example, the inner ring 220 may be mounted and held on the wheel hub 210 by plastically deforming the end portion of the wheel hub 210 as shown in FIG. 5 or by fastening a nut or the like to the vehicle-body-side end portion of the wheel hub 210, in a state in which the inner ring 220 is press-fitted to the stepped portion 234 formed in the vehicle-body-side end portion of the wheel hub 210. Further, a raceway (inner raceway) with which the rolling elements 400 are brought into contact may be formed on the outer peripheral surface of the inner ring 220 to support the rolling elements 400 from the outside in the radially direction.

In the embodiment illustrated in the drawings, the wheel bearing is configured such that one raceway for supporting the rolling elements is directly formed on the portion of a outer peripheral surface of the wheel hub. However, the wheel bearing 100 according to an embodiment of the present disclosure is not limited to such a configuration, but may be modified to have other various wheel bearing structures. For example, the wheel bearing 100 according to an embodiment of the present disclosure may be configured such that two inner rings are mounted on the wheel hub and raceways (inner raceways) for supporting the rolling elements are formed on the two inner rings. Further, the wheel bearing 100 according to an embodiment of the present disclosure may be configured such that the inner rings are mounted on the wheel hub on the inside in the radial direction.

According to an embodiment of the present disclosure, the outer ring constituting the non-rotary element 300 may comprise a vehicle-body-side mounting flange 310 formed on an outer peripheral surface thereof to mount the wheel bearing 100 to the vehicle body. The outer ring may be configured to have raceways (outer raceways) in contact with the rolling elements 400 on an inner peripheral surface thereof. The raceway (outer raceway) formed on the inner peripheral surface of the non-rotary element (outer ring) may be configured to accommodate and support the rolling elements 400 as rolling members between the outer raceways and the inner raceways in cooperation with the raceways (inner raceways) formed on the wheel hub 210 and/or the inner ring 220.

According to an embodiment of the present disclosure, the rolling elements 400 may be disposed between the rotary element 200 and the non-rotary element 300 to perform a function of rotatably supporting the wheel mounted on the rotary element 200 with respect to the vehicle body to which the non-rotary element 300 is coupled.

According to an embodiment of the present disclosure, the wheel mounting flange 230 provided in the rotary element 200 may be configured such that a sensor target used for measuring the rotational speed of the wheel is mounted on one end surface (for example, an end surface located on the vehicle-body-side). For example, the sensor target may be configured of a tone wheel 600, an encoder, and the like, like in conventional wheel bearings.

According to an embodiment of the present disclosure, the tone wheel 600 may comprise a disc-shaped base 610 having a thin plate shape. The tone wheel 600 may be mounted to the wheel mounting flange 230 formed on the wheel hub 210 such that the disc-shaped base 610 is in surface contact with one end surface of the wheel mounting flange 230.

According to an embodiment of the present disclosure, windows 620 having an open structure may be formed in the disc-shaped base 610 of the tone wheel 600 at equal intervals in a circumferential direction. With this configuration, when the tone wheel 600 rotates together with the wheel, a change in magnetic field is generated due to the structure of the windows 620. Such a change in magnetic field may be detected by a sensor member 700 to be described later. As a result, a rotational speed of the wheel can be measured. In the meantime, in order to accurately measure the rotational speed using the tone wheel 600, the window 620 of an open structure formed in the tone wheel 600 may be preferably formed to have a width of 1 mm or more and a height of 1 mm or more.

According to an embodiment of the present disclosure, the tone wheel 600 may comprise bolt inserting holes 630 formed at positions corresponding to the bolt mounting holes 232 of the wheel mounting flange 230. Accordingly, when the tone wheel 600 is mounted on the wheel mounting flange 230, the hub bolts 240 may be inserted into the bolt inserting holes 630. As a result, when the wheel and/or brake disc are (is) mounted on the wheel mounting flange 230 using the hub bolts 240, the tone wheel 600 may also be mounted and fixed to the wheel mounting flange 230. With this configuration, it is possible to assemble the tone wheel 600 to the wheel bearing 100 in a faster and easier manner without an additional mounting structure or an additional mounting process for mounting the tone wheel 600.

According to an embodiment of the present disclosure, in the tone wheel 600, the windows 620 and the bolt inserting holes 630 may be preferably formed such that the windows 620 are disposed further radially outward than the bolt inserting holes 630 so as to easily dispose the sensor member 700 in the vicinity of the windows 620.

According to an embodiment of the present disclosure, the wheel mounting flange 230 of the wheel hub 210 on which the tone wheel 600 is mounted may be provided with a recess 236 formed to be depressed inwardly from a portion where the windows 620 formed in the tone wheel 600 are to be positioned when the tone wheel 600 is mounted. As described above, when the recess 236 is formed at the position (specifically, the position opposite to the sensor member 700 with respect to the tone wheel 600) corresponding to the windows 620, a change in magnetic field may occur by the recess 236 at a relatively great level as the tone wheel 600 rotates. Thus, it is possible to more accurately measure the rotational speed of the wheel. In order to further improve the accuracy of measurement of the rotational speed of the wheel using the tone wheel 600, the recess 236 may be preferably formed at a depth of 1 mm or more in the wheel mounting flange 230.

According to an embodiment of the present disclosure, the tone wheel 600 may further comprise an extension portion 640 extending in the axial direction from the disc-shaped base 610 (for example, from a radially inward end portion of the disc-shaped base 610). The extension portion 640 may be configured to partially or entirely cover a gap formed between a wheel-side end portion of the outer ring and the wheel mounting flange 230 at a radially outer position. More preferably, the extension portion 640 of the tone wheel 600 is configured to partially or entirely cover a wheel-side sealing member 500 mounted on a wheel-side end portion of the wheel bearing 100 at the radially outer position. With this configuration, a labyrinth structure can be further formed at the wheel-side end portion of the wheel bearing 100 by the extension portion 640 of the tone wheel 600, thus further improving the sealing property of the wheel-side sealing member 500. In an embodiment, in order to secure structural safety between the tone wheel 600 and the wheel-side sealing member 500, the extension portion 640 of the tone wheel 600 may be preferably formed to be spaced apart by a distance of 0.3 mm or more in the radially outward direction from a radial outermost portion of the wheel-side sealing member 500. In the meantime, in order to stably mount the tone wheel 600, a stepped mounting portion 238 is formed on the wheel mounting flange 230 of the wheel hub 210, and the extension portion 640 of the tone wheel 600 may be mounted on the stepped mounting portion 238.

According to an embodiment of the present disclosure, the sensor member 700 may be disposed in the vicinity of the window 620 formed in the disc-shaped base 610 of the tone wheel 600 to detect the change in magnetic field generated by the tone wheel 600 and measure the rotational speed of the wheel. For example, the sensor member 700 may be mounted on the outer ring 300 or the chassis member 320 connected to the outer ring 300 such that the sensor member 700 is fixed to the vehicle body. However, the sensor member 700 does not have to be mounted through the outer ring or the like, and may be disposed adjacent to the tone wheel 600 through another part fixed to the vehicle body.

According to an embodiment of the present disclosure, in order to more accurately measure the rotational speed of the wheel, the sensor member 700 may be disposed in a direction perpendicular to the disc-shaped base 610 of the tone wheel 600, namely in a direction perpendicular to the wheel mounting flange 230 of the wheel hub 210.

As described above, in the wheel bearing according to an embodiment of the present disclosure, the tone wheel for measuring the rotational speed of the wheel is mounted on one side of the wheel mounting flange and the sensor member is positioned adjacent to the tone wheel. Thus, it is possible to easily mount the wheel speed sensor even in a structure in which a driving shaft is inserted into a tube housing like in a power transmission structure in the form of axle tube. This makes it possible to greatly improve a degree of freedom of design of the wheel bearing.

Further, the wheel bearing according to an embodiment of the present disclosure is configured such that the tone wheel is mounted on the wheel mounting flange. Thus, it is possible to stably mount and support the tone wheel on the wheel mounting flange of the wheel bearing through the hub bolts without a separate mounting member, thereby improving the productivity of the wheel bearing and reducing the production cost of the wheel bearing.

Furthermore, the wheel bearing according to an embodiment of the present disclosure is configured such that the tone wheel is mounted on the wheel mounting flange of the wheel hub, and the extension portion provided in the tone wheel covers between the wheel mounting flange and the wheel-side end portion of the outer ring (namely, around the wheel-side sealing member) at the radially outer portion. This forms an additional labyrinth structure between the tone wheel mounted on the wheel mounting flange and the wheel-side sealing member, thereby further improving the sealing property of the wheel-side sealing member.

While the present disclosure has been described above by way of particular features such as specific constituent elements and the like, and exemplary embodiments, these embodiments are provided to further facilitate overall understanding of the present disclosure, and the present disclosure is not limited thereto. Various modifications and variations may be made from the above descriptions by those skilled in the art.

In the above-described embodiments, for example, the wheel bearing has been described to have a so-called wheel bearing of a third-generation structure in which one inner ring is mounted to the wheel hub in a press-fitting manner. However, the wheel bearing according to the present disclosure may have another structure, such as a so-called wheel bearing of a 2.5-generation structure in which two inner rings are mounted to a wheel hub, a so-called wheel bearing of a second-generation structure in which a wheel hub functions as an outer member, or the like.

Further, in the above-described embodiments, the wheel bearing has been described with the embodiment in which the rotational speed of the wheel is measured using the tone wheel including the open window. In some embodiments, the tone wheel may be formed to have a toothed structure instead of the open window, a structure including an encoder, or the like.

Therefore, the spirit of the present disclosure should not be limited to the above-described embodiments, and not only the append claims but also all those modified equally or equivalently to the claims are intended to fall within the scope of the spirit of the present disclosure.

What is claimed is:

1. A wheel bearing for rotatably mounting and supporting a wheel of a vehicle to a vehicle body, comprising:
   a rotary element on which the wheel of the vehicle is mounted and which rotates together with the wheel;
   a non-rotary element mounted on a chassis component of the vehicle and fixed to the vehicle body; and
   one or more rolling elements provided between the rotary element and the non-rotary element and configured to rotatably support the rotary element with respect to the non-rotary element,
   wherein the rotary element comprises a wheel mounting flange used for mounting the wheel,
   a tone wheel or an encoder configured to measure a rotational speed of the wheel is mounted on a vehicle-body-side end surface of the wheel mounting flange,
   the tone wheel comprises a plurality of windows,
   the tone wheel is in contact with the vehicle-body-side end surface,
   the wheel mounting flange comprises a recess formed to be depressed inwardly in an axial direction only, and
   a length of the recess on the vehicle-body-side end surface of the wheel mounting flange in a radial direction matches with a length of each of the plurality of windows in the radial direction.

2. The wheel bearing of claim 1, wherein the tone wheel configured to measure the rotational speed of the wheel is mounted on the vehicle-body-side end surface of the wheel mounting flange,
   the tone wheel comprises a disc-shaped base to be mounted on the wheel mounting flange, and
   the plurality of windows having an open structure are provided in the disc-shaped base at equal intervals in a circumferential direction.

3. The wheel bearing of claim 2, wherein the tone wheel comprises bolt inserting holes formed at positions corresponding to bolt mounting holes of the wheel mounting flange and into which hub bolts are inserted when the tone wheel is mounted on the wheel mounting flange.

4. The wheel bearing of claim 3, wherein the windows of the tone wheel are formed such that the windows are disposed on a radially outer portion of the bolt inserting holes.

5. The wheel bearing of claim 4, wherein the recess is formed to be depressed inwardly from a portion where the window of the tone wheel is positioned when the tone wheel is mounted.

6. The wheel bearing of claim 5, wherein a distance between an extension portion of the tone wheel and a radial outermost portion of the wheel-side sealing member is set to be 0.3 mm or more.

7. The wheel bearing of claim 5, wherein the windows formed in the tone wheel are formed to have a width of 1 mm or more and a height of 1 mm or more.

8. The wheel bearing of claim 5, wherein the recess formed in the wheel mounting flange is formed at a depth of 1 mm or more.

9. The wheel bearing of claim 8, further comprising: a sensor member disposed adjacent to the tone wheel mounted on the wheel mounting flange.

10. The wheel bearing of claim 9, wherein the sensor member is configured to measure the rotational speed of the wheel in a direction perpendicular to the disc-shaped base of the tone wheel.

11. The wheel bearing of claim 10, wherein the tone wheel further comprises an extension portion extending in an axial direction from the disc-shaped base.

12. The wheel bearing of claim 11, wherein the extension portion is configured to partially or entirely cover a wheel-side sealing member from a radially outer side of the wheel-side sealing member of the wheel bearing.

13. The wheel bearing of claim 1, wherein the rotary element of the wheel bearing comprises a wheel hub on which the wheel is mounted, and at least one inner ring mounted on the wheel hub in a press-fitting manner,
   the non-rotary element of the wheel bearing is formed as an outer ring to be coupled to the chassis component of the vehicle, and
   the wheel mounting flange is provided in the wheel hub.

14. The wheel bearing of claim 1, wherein the recess is a continuous annular recess.

15. The wheel bearing of claim 1, wherein the recess is radially outwardly and radially inwardly bound by a surface that contacts the tone wheel.

* * * * *